US010843107B2

(12) United States Patent
Bippus et al.

(10) Patent No.: US 10,843,107 B2
(45) Date of Patent: Nov. 24, 2020

(54) REPLACEABLE WATER FILTER AND MEMORY DEVICE FOR APPLIANCE

(71) Applicant: WHIRLPOOL CORPORATION, Benton Harbor, MI (US)

(72) Inventors: Melissa M. Bippus, Evansville, IN (US); Craig C. Lear, St. Joseph, MI (US); Dennis J. Staley, II, Evansville, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 549 days.

(21) Appl. No.: 15/244,421

(22) Filed: Aug. 23, 2016

(65) Prior Publication Data

US 2016/0354715 A1 Dec. 8, 2016

Related U.S. Application Data (63) Continuation of application No. 13/767,107, filed on Feb. 14, 2013, now abandoned.

(51) Int. Cl.
*B01D 35/143* (2006.01)
*B01D 35/02* (2006.01)
(Continued)

(52) U.S. Cl.
CPC .......... *B01D 35/143* (2013.01); *B01D 35/02* (2013.01); *B23P 19/04* (2013.01); *C02F 1/003* (2013.01);
(Continued)

(58) Field of Classification Search
CPC ...... B01D 35/02; B01D 35/30; B01D 35/143; B01D 35/306; B01D 29/96; F25D 11/02;
(Continued)

(56) References Cited

U.S. PATENT DOCUMENTS 4,272,368 A 6/1981 Foord et al.
6,214,239 B1 4/2001 Renau
(Continued)

FOREIGN PATENT DOCUMENTS

| FR | 2825451 A1 | 2/2006 | |
|---|---|---|---|
| WO | 2008017419 A2 | 2/2008 | |
| WO | WO-2008017419 A2 * | 2/2008 | ........... B67D 1/0878 |

OTHER PUBLICATIONS

Original foreign publication WO 2008017419, Feb. 2008, Giordano Roberto.*

*Primary Examiner* — Robert Clemente
*Assistant Examiner* — Akash K Varma
(74) *Attorney, Agent, or Firm* — Price Heneveld LLP (57) ABSTRACT

A water filter communication system and method of using the system. A method of periodically reading water filter data associated with a water filter and retained by the water filter that has been positioned in an appliance includes the steps of: installing a water filter into an engaged position in a filter head assembly within an interior of a cabinet of an appliance that includes a water inlet and a water outlet and periodically, based upon and after a user's interaction with the appliance or the water filter, supplying power from the appliance to the filter read-write memory device engaged to the filter housing; transmitting water filter data to the appliance from the filter read-write memory device, which retains filter information.

19 Claims, 6 Drawing Sheets

(51) Int. Cl.
*B23P 19/04* (2006.01)
*C02F 1/00* (2006.01)
*F25D 23/12* (2006.01)

(52) U.S. Cl.
CPC ...... *F25D 23/126* (2013.01); *C02F 2201/006* (2013.01); *C02F 2209/445* (2013.01); *C02F 2307/12* (2013.01); *F25D 2323/121* (2013.01); *F25D 2700/04* (2013.01); *Y10T 29/49764* (2015.01)

(58) Field of Classification Search
CPC ........ F25D 23/02; F25D 23/12; F25D 23/028; F25D 23/28; F25D 23/126; C02F 1/003
See application file for complete search history.

(56) References Cited

U.S. PATENT DOCUMENTS

| | | | |
|---|---|---|---|
| 6,276,146 | B1 | 8/2001 | Kim et al. |
| 6,375,834 | B1* | 4/2002 | Guess ................. B01D 35/143 |
| | | | 210/138 |
| 6,613,236 | B1 | 9/2003 | Guess et al. |
| 6,741,236 | B2 | 5/2004 | Yun |
| 2002/0189983 | A1 | 12/2002 | Guess et al. |
| 2005/0115877 | A1 | 6/2005 | Underwood et al. |
| 2008/0165282 | A1 | 7/2008 | Marcy et al. |
| 2010/0106265 | A1* | 4/2010 | Ebrom .................... H04L 69/26 |
| | | | 700/90 |

* cited by examiner

REPLACEABLE WATER FILTER AND MEMORY DEVICE FOR APPLIANCE

CROSS-REFERENCE TO RELATED APPLICATION

The present application is a continuation of U.S. patent application Ser. No. 13/767,107 filed Feb. 14, 2013, now abandoned, entitled PRODUCT INDICATION FOR FILTER STATUS UPDATE, the entire disclosure of which is hereby incorporated herein by reference.

BACKGROUND OF THE INVENTION

Filters with electronic systems that provide data about the filter where the electronic system is provided on the filter itself suffer from various issues, which has caused these systems to simply not be adopted due to too many failures in the design and implementation of such filter technology. Current systems often fail after a short period of time due to the refrigerator or freezer environment within which they are placed being very humid and moist environments. The fresh food (refrigerator) compartment and freezer compartment are exposed to humid air outside of the appliance cabinet periodically and then chilled, which often causes increased humidity and sometimes condensation on the appliance surfaces, including surfaces of the filter within the compartment. As such, previous systems employing some kind of electronic system on the filter cease to function after a short period of time due to corrosion caused by the humid environment and the constant power supplied to prior systems in order for them to function. Once the corrosion occurs, any communication of data and/or power between the appliance and the electronic system of the filter ceases to function, or at least ceases to function in a manner the consumer would consider acceptable. For example, without power being able to be delivered to the electronics system of the filter, the appliance would not be able to retrieve any data from the electronic system of the filter. As a result, current systems are widely considered unacceptable and impractical.

SUMMARY OF THE INVENTION

The present invention generally relates to a water filter communication system and methods of using the system. According to one aspect, the present invention includes a method of periodically reading water filter data associated with a water filter in an appliance that includes the steps of: installing a water filter into an engaged position in a filter head assembly within an interior of a cabinet of an appliance that includes a water inlet and a water outlet such that when a water filter is engaged in the filter head assembly, water passes through the water inlet of the filter head assembly and an inlet of the water filter and is treated by at least one filter media within a filter housing interior of the water filter forming treated water and the treated water passes through the outlet of the water filter and the outlet of the filter head assembly; and periodically, based upon and after a user's interaction with the appliance or the water filter, supplying power from the appliance to the filter read-write memory device engaged to the filter housing; transmitting water filter data to the appliance from the filter read-write memory device; displaying at least some of the water filter data to the user of the appliance on a display. The water filter is typically engaged to the filter head assembly by accessing the interior of the cabinet of the appliance. The water filter includes a filter read-write memory device engaged with the housing of the water filter and the water filter has at least one electrically conductive contact that receives electrical power from the appliance and provides electrical power to the filter read-write memory device and at least one contact that sends and receives data between the filter read-write memory device and the appliance.

Yet another aspect of the present invention is generally directed toward a method of preventing corrosion of contacts between a water filter with a filter read-write memory and a filter head assembly that includes the steps of: installing a water filter into an engaged position by accessing the interior of an appliance; and engaging electrical power to the water filter in the engaged position based upon a user's interaction with the appliance or the water filter, thereby supplying power from the appliance to the filter read-write memory device engaged to the filter housing for a time sufficient to allow for data communication between the appliance and the read-write device; and disengaging electrical power to the water filter in the engaged position after the time sufficient to allow for data communication. The water filter typically includes a filter read-write memory device and at least one data or electrical contact positioned in connection with the housing of the water filter such that when at least one data or electrical contact is operably connected to contact(s) associated with the appliance the water filter has at least one electrically conductive contact that receives electrical power from the appliance and provides electrical power to the filter read-write memory device and at least one contact that allows data communication between the filter read-write memory device and the appliance.

According to another aspect of the present invention, a method includes the steps of: installing a water filter into an engaged position in a filter head assembly within an interior of a cabinet of an appliance that includes a water inlet and a water outlet such that when a water filter is engaged in the filter head assembly, water passes through the water inlet of the filter head assembly and an inlet of the water filter and is treated by at least one filter media within a filter housing interior of the water filter forming treated water and the treated water passes through the outlet of the water filter and the outlet of the filter head assembly; and periodically, based upon and after a user's interaction with the appliance or the water filter, supplying power from the appliance to the filter read-write memory device engaged to the filter housing. The water filter is engaged to the filter head assembly by accessing the interior of the cabinet of the appliance and the water filter typically includes a filter read-write memory device physically engaged with the housing of the water filter and the water filter has at least one electrically conductive contact that receives electrical power from the appliance and provides electrical power to the filter read-write memory device and at least one contact that sends and receives data between the filter read-write memory device and the appliance.

These and other features, advantages, and objects of the present invention will be further understood and appreciated by those skilled in the art by reference to the following specification, claims, and appended drawings.

DETAILED DESCRIPTION

Figure 1:
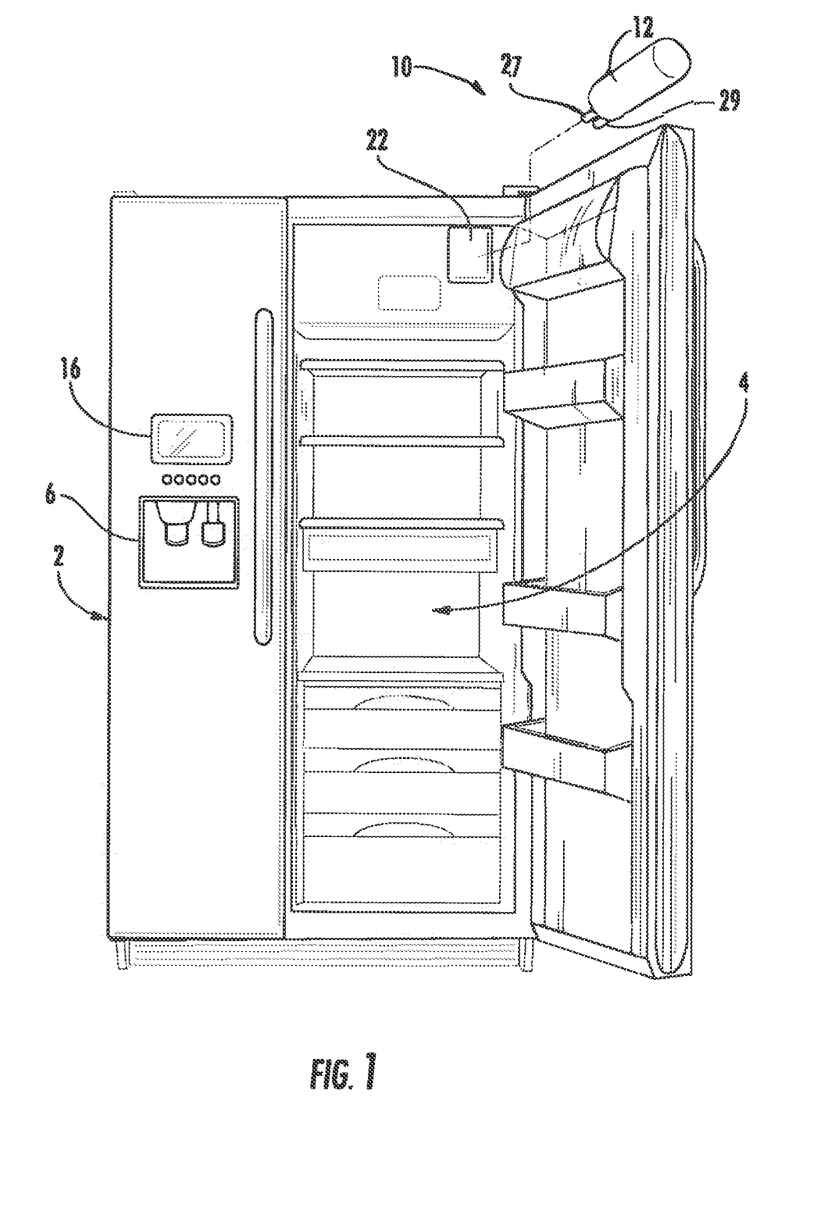
FIG. 1 is a front perspective view of an appliance according to one aspect of the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood by one having ordinary skill in the art that construction of the described invention and other components is not limited to any specific material. Other exemplary embodiments of the invention disclosed herein may be formed from a wide variety of materials, unless described otherwise herein. In this specification and the amended claims, the singular forms "a," "an," and "the" include plural reference unless the context clearly dictates otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The present invention is generally directed toward a water filter communication system 10 as described herein. The water filter communication system typically consists of a water filter 12, a filter head assembly 14, and typically also an appliance 2 having a control unit (for example, a controller, a computer system or a microprocessor) and a display 16. It will be understood by one having ordinary skill in the art that the water filter communication system 10 can be used in a variety of appliances, such as refrigerators, dishwashers, and clothes washers and dryers. Additionally, while FIG. 1 shows a refrigerator appliance 2 with a freezing compartment (not shown but behind the closed door in the drawing) and a refrigeration (fresh food storage) compartment 4, other orientations of such a refrigeration appliance may be employed such as a bottom mount freezer configuration, a top mount freezer configuration, or a free-standing ice machine. Also, an appliance with a single refrigeration compartment or a single freezer compartment may be used. Additionally, the outside of the surface of the appliance typically has a dispenser 6 that typically allows for both ice and water dispensing through the door of the appliance, but could conceivably allow for dispensing of either water or ice or some other fluid and in a location other than the exterior door. Further, it will be understood that the water filter communication system 10 can be used for a variety of applications, such as a second stage water filter for a dishwasher, a water steam filter for an oven, and a water cleaning filter for consumption by a user out of a refrigerator. These are examples only and are not meant to be limiting.

The appliance 2 of the present invention typically has a user interface such as a display 16 that displays information to user about a variety of topics. The display may be a graphical display such as an LCD or LED display. The display may be a touch screen display configured to both display information to the user and receive input from a user. The display may also be a non-graphical display but may be one or more illuminating light indicators such as an LED bulb(s), for example. Among the topics that might be displayed to the user through the display include filter status information. A single LED may display, for example, a green light when the filter is "good," a yellow light when a replacement filter should be ordered, and a red light when the filter should be replaced. This same information may be conveyed via an LCD, LED or other display screen as well.

In addition to the filter's current condition, the filter status information display to a user can include, but is not limited to: the date the filter was installed, the type of filter, the water filter capacity, filter usage data, the number of days until a replacement water filter unit is needed, the volume of water until a replacement filter unit is needed, filter specification information, and filter reordering information, and the model of the filter installed in the appliance. The information that might also be displayed on the appliance display screen may also include information about the ice that is being dispensed, cube or crushed, for example, and the amount of water to be dispensed or that has been dispensed. Depending on the nature of the display, other information may also be displayed such as photographs, installation instructions about replacement of a filter, other maintenance information about the filter or the appliance in general, or other information of interest to the user. The appliance display 16 is typically communicatively connected to a control unit associated with the appliance such as a controller, microprocessor, logic circuit, or CPU (typically positioned within the appliance cabinet). The control unit is also typically communicatively connected to send and receive a signal or data to and from a control panel that receives input from a user and serves as an interaction point with the user. The display may or may not function as the control panel. Manually actuated buttons may function as a part of the control panel to receive user input.

As discussed in more detail later herein, the water filter 12 of the present invention includes a read-write memory device 20 that is readable by a read-out device, which may be the control unit of the appliance. The read-write memory device may function, at least in part, as a form of an electronic identification system for the filter. The read-write memory device is typically engaged to the filter housing 18, retains data, and communicates with at least the control unit of the appliance.

The water filter head assembly may be accessed by opening a filter head assembly access door. The filter head assembly access door may be spring biased by a spring member 24. The filter head assembly also typically contains an outlet 26 and an inlet 28. The outlet and the inlet are typically in fluid connection with the filter 12 when the filter 12 is engaged with the filter head assembly 14.

Figure 2:
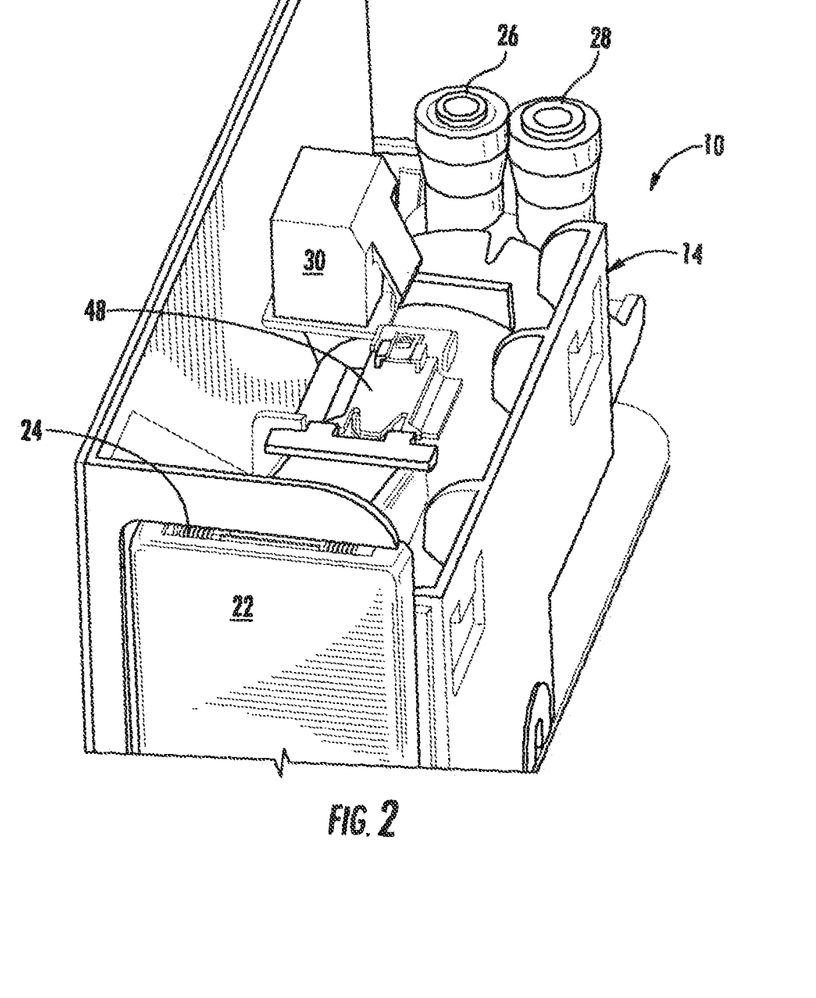
FIG. 2 is a top perspective view of a water filter engaged in a filter head assembly of an appliance.
Figure 3:
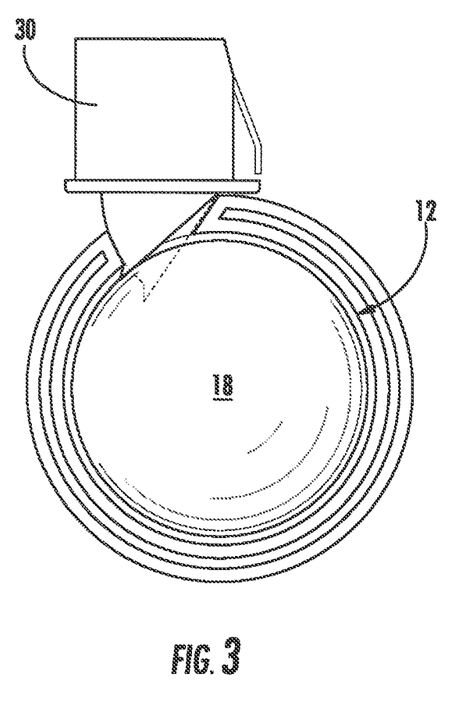
FIG. 3 is a schematic cross-section view of the water filter engaging a mechanical switch within the filter head assembly.
Figure 4:
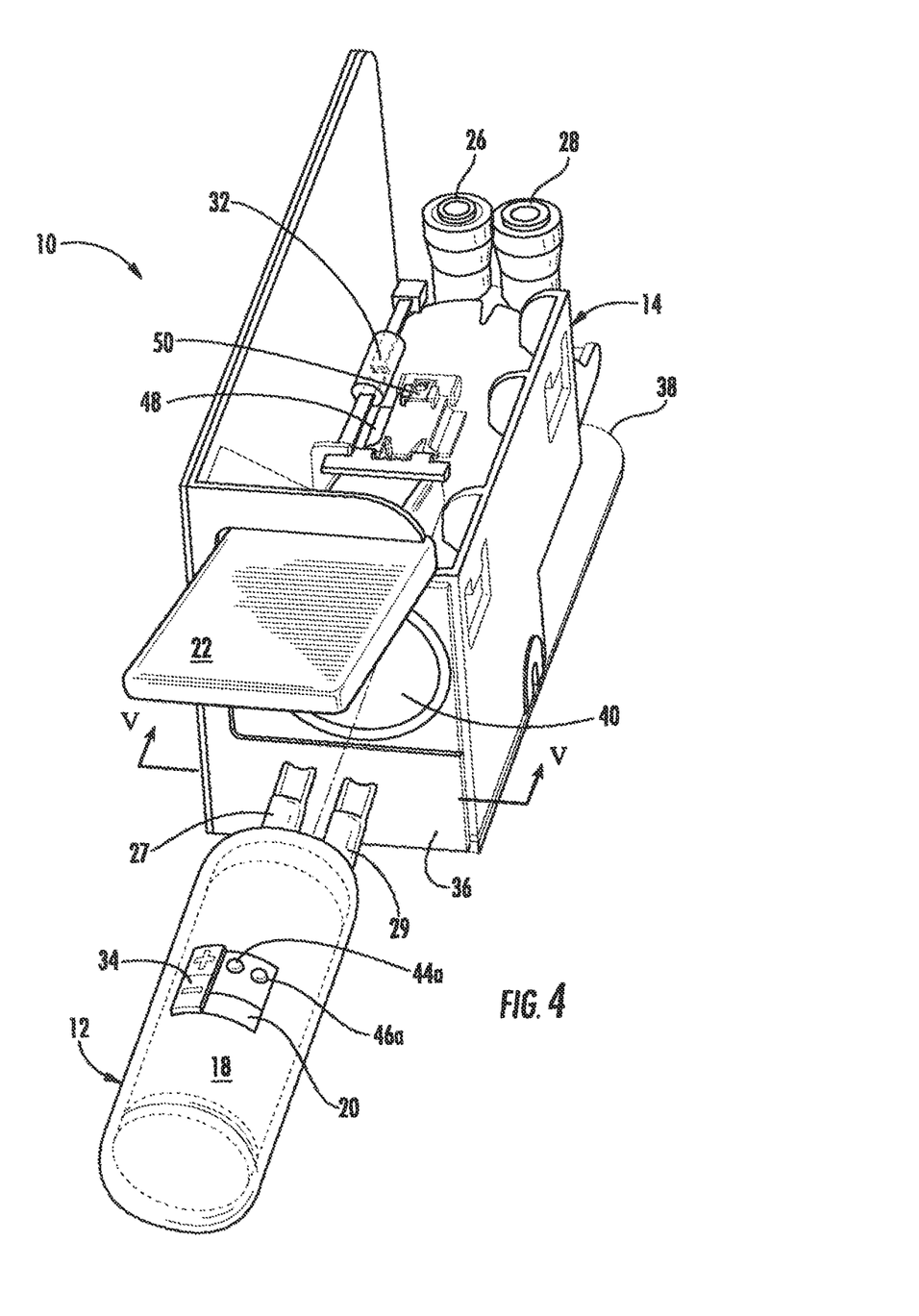
FIG. 4 is an exploded perspective view showing the filter engagement/disengagement with the filter head assembly.

As shown in FIGS. 2-3, the filter head assembly of the present invention may also include a mechanical switch that is biased when the filter 12 is installed within the filter head assembly 14. The mechanical switch sends a signal to the control unit of the appliance. In this manner, the control unit of the appliance knows when a filter 12 has been removed or installed due to actuation of the switch. Similarly, as shown in FIG. 4, the filter head assembly may contain a reed switch, which is closed when the filter 12 is inserted into the filter head assembly 14. The reed switch 32 of the filter assembly is closed by a magnet 34, which is typically engaged to the housing of the filter 12, more typically integrally engaged with the housing of the filter 12 such that when the filter is engaged with the filter head assembly, the reed switch is closed. As with the mechanical switch, the reed switch communicates to the control unit of the appliance that a filter has been installed or removed.

The water filter 12 may be any configuration that matingly engages the filter head assembly 14 of a given appliance to allow water to flow through and be treated by the water filter by traveling into the filter head assembly through the filter head assembly inlet 28, into the water filter through the water filter inlet 29, into contact with at least one water treatment/filtration media, out the water filter 12 through the water filter outlet 27 and out of the water filter head assembly outlet 26 and through fluid conduits to a dispensing location. The treated water may flow through water conduits within the appliance to be dispensed for drinking at the dispenser 6, for example, or delivered to another device within the appliance, such as an ice maker (typically positioned within a door of the appliance, within the freezer compartment or in a top cap section of the appliance).

Figure 5:
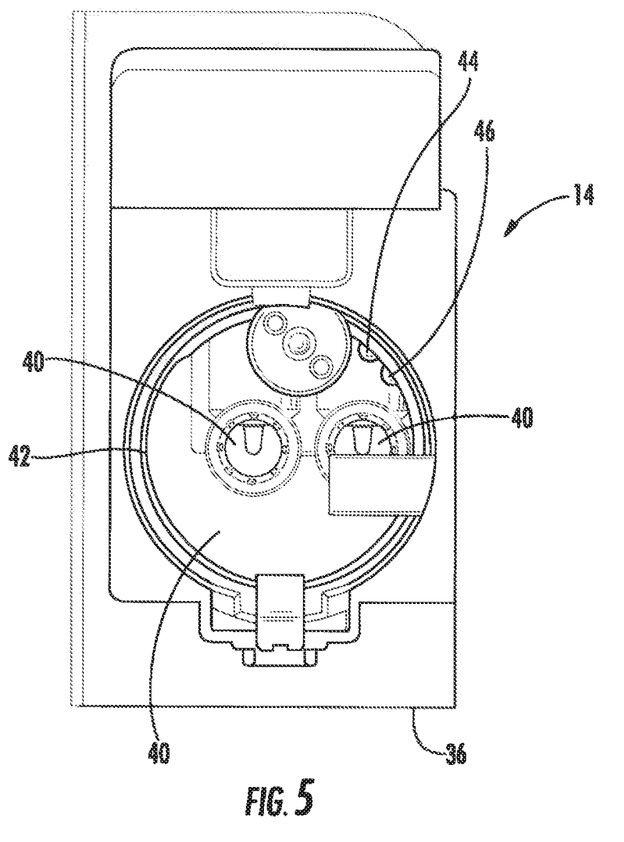
FIG. 5 is an elevated end view taken along line V-V of FIG. 4.
Figure 6:
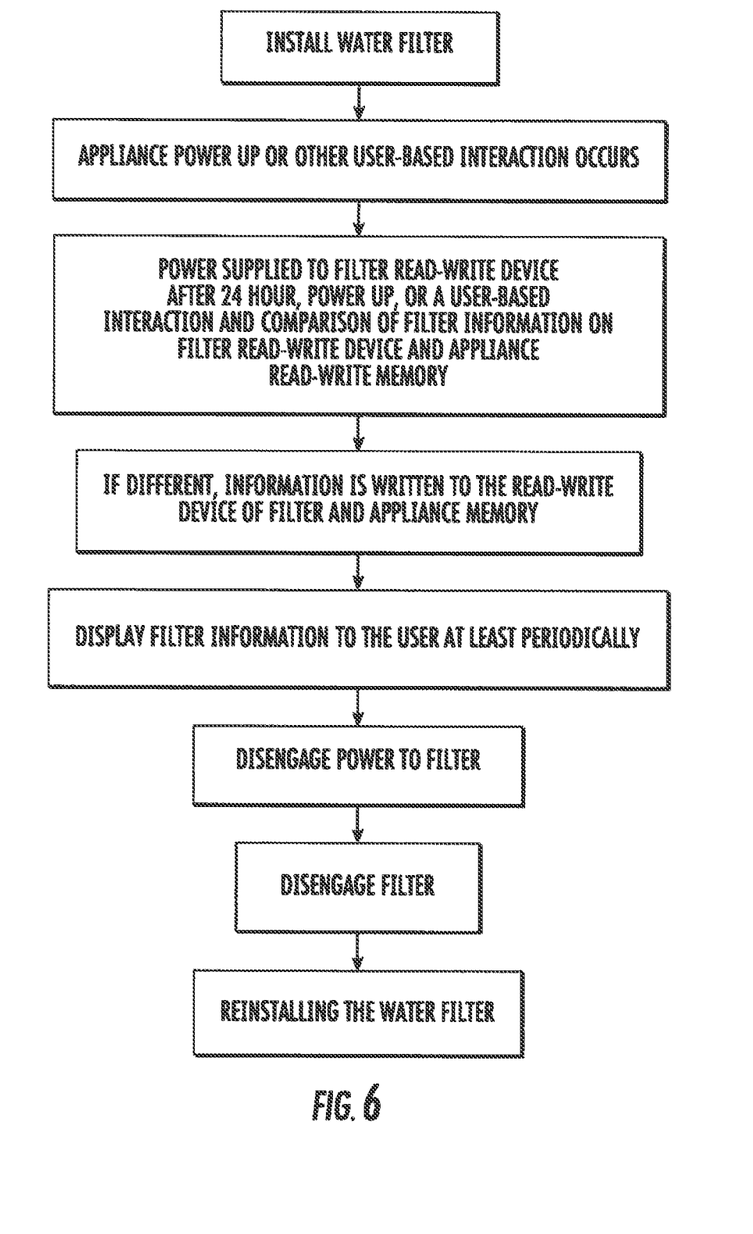
FIG. 6 is a general process according to an aspect of the present invention.

As shown in FIGS. 4-5, the filter head assembly includes a filter receiving end 36 and a water receiving end 38. The filter head assembly 14 typically has at least one cylindrical receiver aperture 40. In the embodiment shown in FIGS. 4-5, the filter 12 has an outlet 27 and inlet 29 that engage two receiving apertures 40 within the interior of the filter head assembly. As discussed above, the nature of the filter configuration may be any known filter configuration. It should be appreciated that a single receiver aperture may be employed in the filter head assembly 14, which would matingly engage a single appendage of a corresponding filter. One such filter and filter head assembly configuration that might be employed in connection with the present invention is U.S. patent application Ser. No. 13/233,347 entitled, ELECTRONIC INTERFACE FOR WATER FILTER SYSTEM, filed on Sep. 15, 2011, now U.S. Pat. No. 8,580,109, the entire disclosure of which is hereby incorporated by reference in its entirety. Conceivably any number of inlets and outlets on the filter may be used such that they correspond to a number of receiver apertures 40 within the filter head assembly.

As shown in FIG. 5, the filter head assembly 14 typically has connectors 44a, 46a that extend from an edge of the cylindrical sidewall 42 of the filter head assembly. The cylindrical sidewall 42 typically has at least one electrical connector 44 that is configured to transfer power and a data connector 46 that is configured to transfer one or more data signals; however, both data and electrical power may be received through a single connection instead of a plurality of connections. The connection does not necessarily need to be a physical connection, but typically is a physical connection. The type of connection is also not critical so long as a secure and reliable connection is formed. The connections that are used typically correspond and engage (matingly or frictionally for example) with similar connections on the housing of the filter 12. The connectors 44a, 46a on the filter 12 engage the connectors 44, 46 of the filter head assembly when the filter 12 is in the engaged position within the filter head assembly.

A clip 48 is typically positioned on the exterior circumference of the filter head assembly 14 and is typically designed to support an electronic connector 50 on the filter head assembly 14. The electronic connector engages a signal wire via a connector (not shown) that is connected with the control unit of the appliance. In this manner, a reliable, secure connection to supply power and transmit data is made between the filter's read-write memory device 20 and the control unit of the appliance via the filter head assembly. The filter read-write memory device may be an electronic identification system. In one example, the read-write memory may be made of a chip card having a small piece of an EEPROM (an electronically erasable programmable read-only memory device, which is a read and write memory remaining intact without electrical supply), a PIT (programmable identification tag) or other similar chip card in which both the energy and the information may be transmitted a distance conceivably without physical contact. A so-called "smart card" in which memory of a chip card is extended to a microcontroller configured to carry out multiple computations may also be employed. The read-write device may also be a read-write radio frequency identification device, a controller, a microprocessor, a control board or a logic circuit. The systems typically should be configured to store data without the continued use of power.

The process of the present invention typically includes first installing a filter 12 into position within the filter head assembly. This is typically accomplished by opening the access door 22 and inserting the filter 12. Typically, the filter is rotated either clockwise or counterclockwise to engage the filter 12 with the filter head assembly 14 or by pushing the filter into engagement. The engagement brings the connector(s) of the filter into engagement with the connector(s) of the filter head assembly such that power can be transmitted from the appliance to the read-write memory device of the filter that is engaged with the filter.

Next, periodically, based upon and after a user's interaction with the appliance or the water filter, the appliance supplies power from the appliance to the filter read-write memory device engaged to the filter housing. The filter's read-write device and the appliance control unit typically compare data stored on the filter with data previously transmitted to and stored in connection with the appliance control unit, if any. The data from the filter's read-write memory is typically transmitted to the appliance from the filter read-write memory device and stored by the memory component of the control unit of the appliance. At least some filter data may be displayed to the user of the appliance on the display, as discussed above. The data transmitted from the filter to the appliance and optionally other data from the appliance may be automatically displayed or displayed in response to a user request for information via the control panel or the display if the display has user interaction capability, such as a touch-sensitive display such that it operates as a display and a control panel. The control panel may be a separate touch sensitive display separate from the display 16.

Next, the water filter may be removed, either for use in connection with another appliance or after it has ceased to function and expired due to use and/or time. The filter 12 is typically removed from the filter head assembly by rotating the filter the opposite direction from the install direction or pushing the filter forward slightly, which causes release of the filter from the filter head assembly. The filter may be reinstalled into the same filter head assembly (if not expired due to use) or used in connection with a new appliance. If the filter is installed later or into the same or a new appliance that uses the present system, the filter communicates various filter information stored on the read-write device to the appliance and can display that information to the user. In this manner, for example, if a filter with a useful life of about 6 months (about 180 days) has been used for 5 months in one appliance and the filter is removed, stored for a period of time or installed into the same or another appliance, the new appliance or the existing appliance can receive data and convey to the user various filter information that will include, for example, the fact that the filter has about one month that the filter can still be used or optionally instead of or in addition to a timeframe, a certain volume of water that it can still be used for while treating the water flowing through it. The filter information/data is carried with the filter. The filter capacity is typically set at about 200 gallons or about a 180 day lifespan (typically whichever is shorter). However, the present system allows for filters of differing lifespans to be employed, and the appliance will know or learn the lifespan of the filter by accessing the read-write device on the filter. This allows a consumer to purchase filters with useful lifespans that are shorter or longer than 200 gallons or 180 days and the option to do so as they desire. The systems of the present invention may track one or both of these parameters as filter information and communicate when either or both usage benchmarks have passed, i.e. the filter has treated 200 gallons and/or 180 days has past. As discussed above, the system would also be configured to warn of the upcoming usage expiration parameters, which could vary, but could be, for example, a warning (yellow indicator or other output to the user) that 150 days have passed or that 50 gallons of filter life remain. The information conveyed to the user may indicate "ORDER" or a similar indicator at this stage and "REPLACE" or similar notification after the expiration period. Similarly, the status would likely state: "GOOD" if the filter is newer than the preset limit for displaying the caution (yellow) or ORDER indicator. The display of this type of information is done at appropriate intervals, if necessary.

The filter communication system of the present invention is significantly different than previous designs in that power is not supplied to the read-write device of the filter continuously. Instead, power in particular, but typically data also, are only transmitted to the read-write device and data transmittal to and from the read-write device after a user initiated event. The user event could be, but is not limited to: powering of the appliance from an unpowered status; a power outage; if communication is lost between the appliance and the filter during a data communication attempt between the filter and the appliance; removal of the filter; engagement of the filter; manual interaction with a reset initiating input device that may be a part of the control panel; user interaction with the dispenser 6, or the actuation of water usage devices such as ice makers; user interaction with an access door that would permit the user to remove the water filter 12 from the filter head assembly 14; and the detected removal or installation of a filter 12 within the filter head assembly 14 by actuation of a switch, such as the mechanical switch or the reed switch systems described above or other device that indicates that the filter may have been accessed and potentially removed and/or replaced. The appliance will typically try and communicate with the read-write device of the filter at least about every 24 hours if a user-based stimulus has not caused communication within about a 24 hour period.

In response to any of these situations or any other user based action that would permit a user to access and potentially remove or install a water filter into the water filter head assembly, power is only supplied to the filter's read-write device for a short period of time. Power is typically only supplied to the filter's read-write device for a time sufficient to allow for the appliance and the filter to compare data about the filter with data stored on the filter's read-write device and data stored within the read-write memory associated with the control unit of the appliance (the read-write memory of the appliance may or may not be a part of the control unit) and, if necessary, write new data to the filter's read-write device and/or the memory of the appliance control unit.

Significantly, the fact that power is not continuously supplied to the read-write device of the filter unit prevents corrosion from occurring at the connection of the connectors on the filter and the filter head assembly. This lack of corrosion in this environment that is otherwise highly susceptible to corrosion allows for the filter to retain information about the filter on the filter and reliably convey the data to one or more appliances. The data pertinent to the filter, in particularly filter life and usage data may be reliably kept on the filter and conveyed from the filter.

The invention claimed is:

1. A replaceable water filter apparatus for a home appliance, wherein the home appliance is configured to deprive the replaceable water filter apparatus of a power supply during temporal periods of inactivity, the replaceable water filter apparatus comprising:
   a filter body comprising an engaging portion configured to be received by a filter head of the appliance;
   a filter inlet and a filter outlet configured to exchange water with the filter head; and
   a memory device comprising at least one conductive contact, the at least one conductive contact configured to communicatively couple the memory device to a control unit of the appliance, wherein the memory device is configured to operate on the power supplied via the at least one conductive contact from a power source of the appliance and store data communicated from the appliance during the temporal periods of inactivity while the memory device is deprived of the power from the power source, wherein the memory device is configured to receive the power via the at least one conductive contact in response to a usage query or update of the data stored in the memory device, wherein the memory device only receives the power from the appliance during an access or update of the data stored in the memory device.

2. The filter apparatus according to claim 1, wherein the memory device is configured to electronically communicate an identification of the filter apparatus to the control unit via the at least one conductive contact.

3. The filter apparatus according to claim 1, wherein the memory device is configured to store the data and communicate the data to the appliance such that the appliance identifies a usage of the filter apparatus during the usage query.

4. The filter apparatus according to claim 1, wherein the memory device is configured to maintain the data throughout operation.

5. The filter apparatus according to claim 3, wherein the filter apparatus does not comprise an internal power supply sufficient to power the memory device during the temporal periods while deprived of the power from the power source.

6. The filter apparatus according to claim 1, wherein the temporal periods while the memory device is deprived of the power source correspond to periods wherein the memory device is isolated from the power source.

7. The filter apparatus according to claim 1, wherein the usage query corresponds to a user request via a control panel of the home appliance for information stored in the data.

8. The filter apparatus according to claim 1, wherein the usage query corresponds to usage of the filter apparatus causing the exchange of the water with the filter head of the appliance.

9. A replaceable water filter apparatus for a home appliance, wherein the home appliance is configured to deprive the replaceable water filter apparatus of a power supply during temporal periods of inactivity, the replaceable water filter apparatus comprising:
   a filter body comprising an engaging portion configured to be received by a filter head of the appliance;
   a filter inlet and a filter outlet configured to exchange water with the filter head; and
   a memory device comprising at least one conductive contact, the at least one conductive contact configured to communicatively couple the memory device to a control unit of the appliance, wherein the memory device is configured to operate on the power supplied via the at least one conductive contact from a power source of the appliance, wherein the memory device limits corrosion of the at least one conductive contact by maintaining data communicated from the appliance while deprived of the power from the power source of the appliance in response to the temporal period of inactivity of the filter apparatus, wherein the memory device only receives the power from the power source of the appliance during a usage query and an update of the data stored in the memory device.

10. The filter apparatus according to claim 9, wherein the memory device receives the power from the power source in response to a user interaction.

11. The filter apparatus according to claim 10, wherein the user interaction corresponds to a detection of an installation of the filter apparatus.

12. The filter apparatus according to claim 9, wherein the memory device comprises a programmable identification card configured to electronically communicate an identification of the filter apparatus to the control unit via the at least one conductive contact.

13. The filter apparatus according to claim 9, wherein the memory device comprises an electronically programmable memory configured to maintain the data during the temporal periods while deprived of the power and update the data only when receiving the power from the power source.

14. The filter apparatus according to claim 9, wherein the filter apparatus does not comprise an internal power supply sufficient to provide operating power to the memory device during the temporal periods while deprived of the power from the power source.

15. A replaceable water filter apparatus for a home appliance comprising:
   a filter body comprising an engaging portion configured to be received by a filter head of the appliance;
   a filter inlet and a filter outlet configured to exchange water with the filter head; and
   a memory device comprising at least one conductive contact, the at least one conductive contact configured to communicatively couple the memory device to a control unit of the appliance, wherein the memory device is configured to operate on power supplied via the at least one conductive contact from a power source of the appliance and maintain data communicated from the appliance, wherein the memory device is deprived of power during temporal periods of inactivity of the filter and only receives the power from the power source of the appliance during an access or update in the memory device, and wherein the deprivation of power during the temporal periods of inactivity of the filter limits corrosion of the at least one conductive contact.

16. The filter apparatus according to claim 1, wherein the memory device is configured to limit corrosion of the at least one conductive contact by maintaining data during periods while disengaged from the power supplied by the power source.

17. The filter apparatus according to claim 10, wherein the user interaction corresponds to an event that causes the exchange of the water with the filter head.

18. The filter apparatus according to claim 10, wherein the filter apparatus is configured to receive the power via the at least one conductive contact in response to the user interaction with the appliance.

19. The filter apparatus according to claim 9, wherein the deprivation of the power is in response to a cessation of an operation of the filter.

\* \* \* \* \*